United States Patent
Kennel

(10) Patent No.: US 8,078,569 B2
(45) Date of Patent: Dec. 13, 2011

(54) ESTIMATING TRANSACTION RISK USING SUB-MODELS CHARACTERIZING CROSS-INTERACTION AMONG CATEGORICAL AND NON-CATEGORICAL VARIABLES

(75) Inventor: Matthew Bochner Kennel, San Diego, CA (US)

(73) Assignee: Fair Isaac Corporation, Minneapolis, MN (US)

(*) Notice: Subject to any disclaimer, the term of this patent is extended or adjusted under 35 U.S.C. 154(b) by 897 days.

(21) Appl. No.: 12/056,186

(22) Filed: Mar. 26, 2008

(65) Prior Publication Data

US 2009/0248600 A1 Oct. 1, 2009

(51) Int. Cl.
*G06F 15/00* (2006.01)
*G06F 15/18* (2006.01)

(52) U.S. Cl. ............ 706/62; 706/15; 706/16; 706/20; 706/21; 706/45; 706/47; 706/52; 705/1.1; 705/7.28; 705/14.26; 705/14.47

(58) Field of Classification Search .......... None
See application file for complete search history.

(56) References Cited

U.S. PATENT DOCUMENTS

| | | | | |
|---|---|---|---|---|
| 5,819,226 A * | 10/1998 | Gopinathan et al. | ............ | 705/44 |
| 6,330,546 B1 * | 12/2001 | Gopinathan et al. | ............ | 705/35 |
| 6,405,173 B1 | 6/2002 | Honarvar et al. | | |
| 7,392,216 B1 * | 6/2008 | Palmgren et al. | ............... | 705/37 |
| 7,653,593 B2 * | 1/2010 | Zarikian et al. | .................. | 705/38 |
| 2002/0128960 A1 * | 9/2002 | Lambiotte et al. | ............... | 705/38 |
| 2003/0149603 A1 * | 8/2003 | Ferguson et al. | .................. | 705/7 |
| 2004/0153663 A1 * | 8/2004 | Clark et al. | .................... | 713/200 |
| 2006/0129427 A1 * | 6/2006 | Wennberg | ......................... | 705/2 |
| 2007/0208600 A1 * | 9/2007 | Babus et al. | ..................... | 705/7 |
| 2008/0010188 A1 * | 1/2008 | Beardsell et al. | ............... | 705/38 |

OTHER PUBLICATIONS

U.S. Appl. No. 11/832,610, filed Aug. 1, 2007, Feinstein.
U.S. Appl. No. 11/966,820, filed Dec. 28, 2007, Feinstein et al.
U.S. Appl. No. 11/966,798, filed Dec. 28, 2007, De Zilwa et al.

* cited by examiner

*Primary Examiner* — Omar Fernandez Rivas
(74) *Attorney, Agent, or Firm* — Mintz, Levin, Cohn, Ferris, Glovsky and Popeo, P.C.

(57) ABSTRACT

In one aspect, input data for a predictive model characterizing a level of risk for a data transaction is received that includes values for categorical variables and one or more of binary variables and continuous variables the predictive model. Thereafter, one or more of the categorical variables is associated with one of a plurality of keys. Each key having corresponding coefficients for at least a subset of the binary variables and the continuous variables and the coefficients being dependent on a value for the key. A composite value based on values for each of at least a subset of the binary variables and the continuous variables as calculated using the corresponding coefficients for each key can then be generated. Scoring of the data transaction using the binary variables, the continuous variables, and the composite variables can then be initiated by the predictive model. Related apparatus, systems, techniques and articles are also described.

25 Claims, 2 Drawing Sheets

ESTIMATING TRANSACTION RISK USING SUB-MODELS CHARACTERIZING CROSS-INTERACTION AMONG CATEGORICAL AND NON-CATEGORICAL VARIABLES

TECHNICAL FIELD

The subject matter described herein relates to the estimation of risk using a predictive model that characterizes cross interactions among both categorical and non-categorical input variables.

BACKGROUND

Predictive models for characterizing whether a certain data transaction, such as an authorization for a credit or debit card payment, is indicative of fraud typically base such decisions on a plurality of inputs. These inputs can, for example, comprise continuous (e.g., any value within a range), binary (e.g., true/false), or categorical variables (e.g., merchant code, employee number, etc.).

Conventional predictive models have difficulties characterizing 'cross' interactions between categorical variables and other continuous or binary variables. Cross interactions in this context refers to that the risk function conditioned on the other variables is significantly different as a function of the categorical variable. For instance, transactions for in-home domestic services, such as carpet cleaning, could conceivably have a substantial probability of being fraudulent if they occur in foreign countries far from the cardholder's home, since most cardholders use these purchases for their own homes. However, transactions for tourist-oriented travel and entertainment services may well be legitimate if they take place overseas. Similarly, risky transaction amounts will depend on the type of merchant as well.

SUMMARY

In one aspect, input data for a predictive model characterizing a level of risk for a data transaction is received that includes values for categorical variables and one or more of binary variables and continuous variables the predictive model. Thereafter, one or more of the categorical variables is associated with one of a plurality of keys. Each key having corresponding coefficients for at least a subset of the binary variables and the continuous variables and the coefficients being dependent on a value for the key. A composite value based on values for each of at least a subset of the binary variables and the continuous variables as calculated using the corresponding coefficients for each key can then be generated. Scoring of the data transaction using the binary variables, the continuous variables, and the composite variables can then be initiated by the predictive model.

In some implementations, a probability estimation model can be used. For example, the probability estimation model can be a linear logistic regression model that provides a logarithm of odds for the data transaction as a linear function of the binary and continuous variables as weighted by the coefficients associated with the keys plus a constant offset. In some variations, the coefficients for binary and continuous variables that have been deemed not to be statistically significant can be set to zero. In other implementations, the probability estimation model can be a non-linear logistic regression model.

The predictive model may be comprised of a plurality of nodes in which at least a subset of the binary variables, the continuous variables, and the composite variables can be provided to such nodes The nodes of the predictive model can form, for example, part of a neural network and/or a support vector machine.

One or more of the categorical variables can be associated with a default value if there is not a corresponding key for such categorical variable and/or if is determined that the corresponding key does not have sufficient training data. Moreover, the determined composite value can be modified with respect to a default value depending on a quantity of training data for the particular key.

The data transaction can, for example, comprise a payment card transaction, and the scoring of the data transaction can indicate whether the data transaction is likely to be fraudulent.

In an interrelated aspect, input data for a predictive model that characterizes a level of risk for a data transaction that includes values for categorical variables and one or more of binary variables and continuous variables is received. Thereafter, for each of at least two cascading sub-models, one or more of the categorical variables are associated with one of a plurality of keys. Each key has corresponding coefficients for at least a subset of the binary variables and the continuous variables with the coefficients being dependent on a value for the corresponding key. Output for at least one of the cascading sub-models acts as a direct or indirect input to at least one of the other cascading sub-models (e.g., at least two sub-models are serially linked, etc.). A composite value based on values for each of at least a subset of the binary variables and the continuous variables as calculated using the corresponding coefficients for each key is generated. Thereafter scoring of the data transaction by the predictive model using the binary variables, the continuous variables, and the composite variables determined for each of the at least two cascading sub-models can be initiated.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, the current subject matter does not require that predictor variables be discretized. By using a regression model which is fit directly against the target tag and inputs, numerous variables can be included simultaneously. The fitting procedure itself will be able to weigh the relative importance of these predictor variables, e.g. whether amount or hour or geography are most important predictors of risk for any given categorical key.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
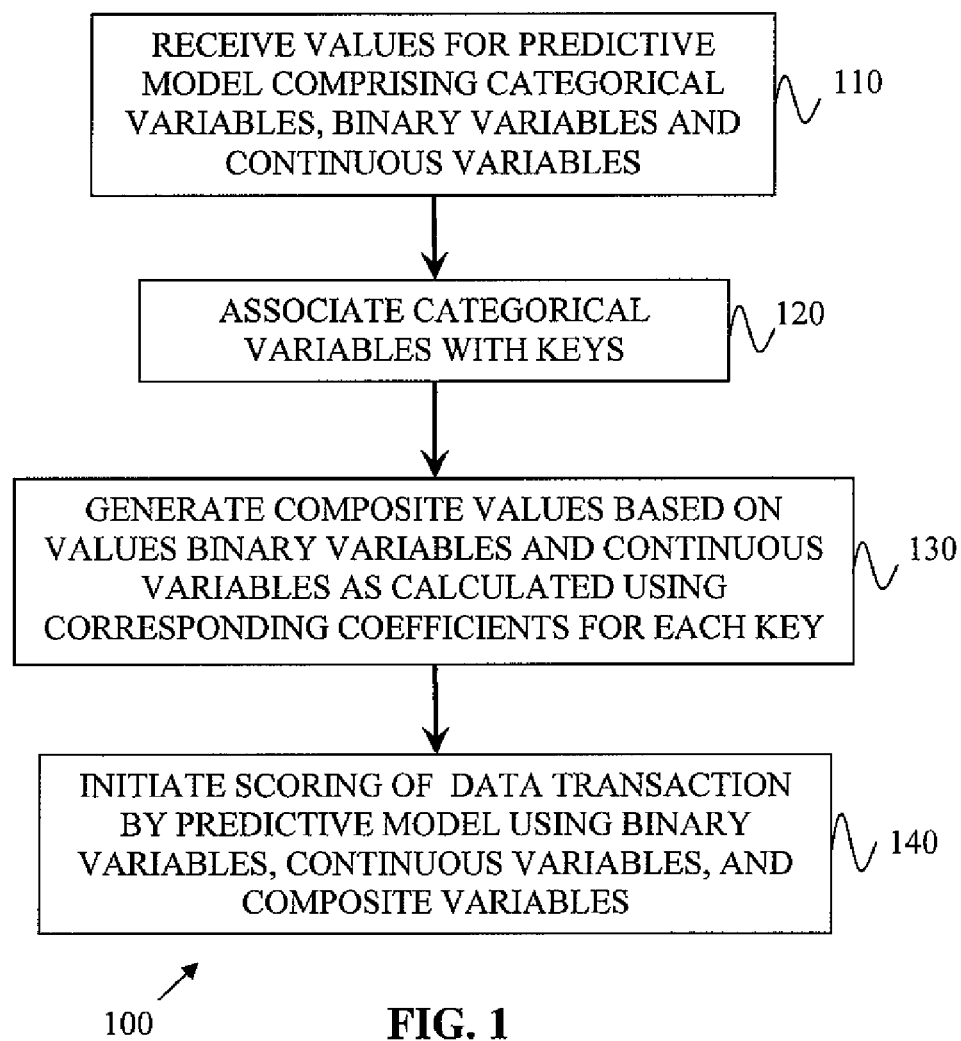
FIG. 1 is a process flow diagram illustrating a technique for estimating risk associated with a data transaction based on arbitrary and non-arbitrary variables.

FIG. 1 is a process flow diagram illustrating a method 100, in which at 110, input data for a predictive model that characterizes a level of risk for a data transaction (e.g., whether a payment card transaction is indicative of fraud) is received. This input data includes inputs such as values for categorical variables and one or more of binary variables and continuous variables. Thereafter, at 120, one or more of the categorical variables is associated with one of a plurality of keys. Each key having corresponding coefficients for at least a subset of the binary variables and the continuous variables. The coefficients being dependent on a value for the key. A composite value can be generated, at 130, based on values for each of at least a subset of the binary variables and the continuous variables as calculated using the corresponding coefficients for each key. Subsequently, at 140, scoring of the data transaction by the predictive model using the binary variables, the continuous variables, and the composite variables is initiated.

Figure 2:
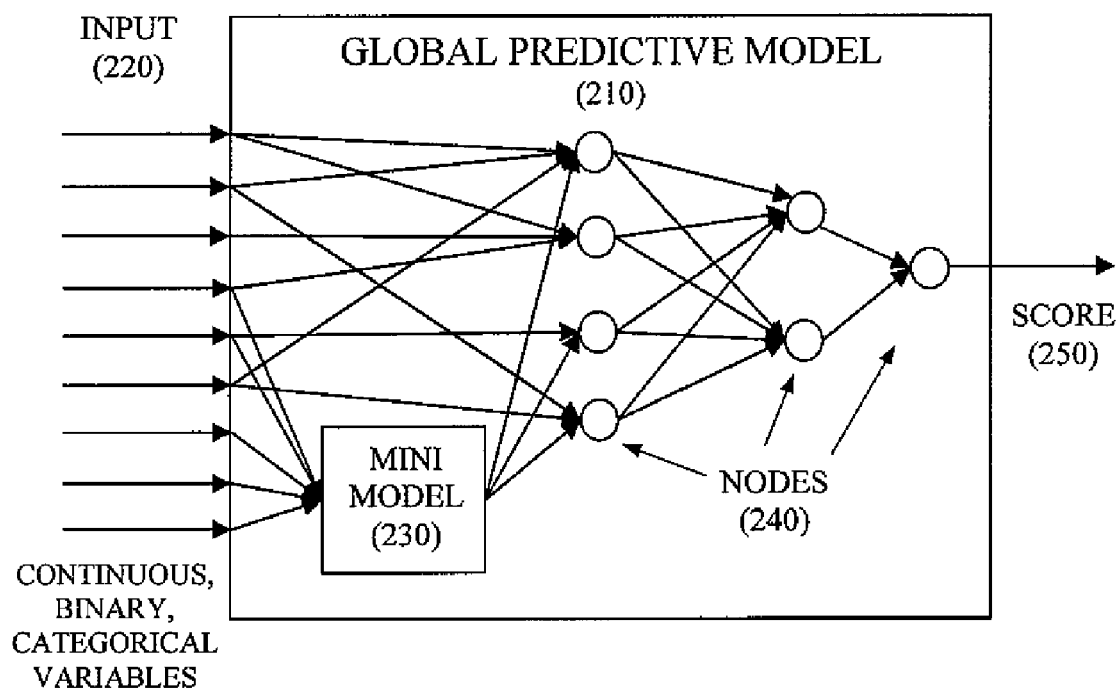
FIG. 2 is a diagram illustrating a global predictive model which incorporates at least one mini-model.

FIG. 2 is a diagram 200 illustrating a global predictive model 210. As used herein, global predictive model refers to an overall predictive model that includes one or more sub or mini-models to score a data transaction such as a payment card transaction. Values for continuous variables and binary variables (generally referred to herein as non-arbitrary variables), as well as categorical variables (generally referred to herein as arbitrary variables) are input 220 to the global predictive model 210. One or more mini-models 230 (which can be arranged serially or in parallel (i.e., cascading)) can take a portion of the input 220 and provide a result to one or more nodes 240 of the global predictive model 210 (with the remaining nodes receiving input values directly). An output of the global predictive model can, for example, comprise a score 250.

The input 220 to the global predictive model 210 and/or the mini-model 230 can be derived from a wide variety of sources. For example, values for variables can be derived from sequences of raw data corresponding to payment card processing systems, and other data sets, such as cardholder data bases. In some implementations, values for the variables can be derived from sequences of raw data derived from Internet communication with on-line services, such as on-line banking or on-line merchandising, plus other data sets such as customer data bases. Additionally or in the alternative, input values can be derived from sequences of raw data relating electronic funds transfer systems, along with data sets such as account and client data bases.

Transaction data, such as payment card authorization data used in models for detecting fraudulent activity in connection with data transactions (such as financial transactions), often has categorical (discrete or arbitrary) fields as well as continuous-valued fields and binary value fields (collectively referred to herein as non-arbitrary fields) which may add to predictive capability for estimating fraud or credit risk. One example of such a model is FALCON Fraud Manager by Fair Isaac Corporation. Continuous fields or derived quantities as a function of continuous fields may be fed directly to a predictive model, such as a logistic regression model or a neural network, as used in FALCON Fraud Manager. However, when data is categorical (i.e., the meaning is discrete and the actual numerical value (if any) irrelevant), such data cannot be usefully included as inputs to a neural network. Examples of categorical data used in analytic models include four-digit Merchant Category Code, or postal (ZIP) codes.

The current subject matter exploits cross-interactions between numerous continuous and binary variables and specific values of categorical variables in order to provide enhanced predictive power. Such models, in this context, can be referred to as "mini-models" or "sub-models", as they predict risk over a subset of data and inputs to an overall predictive model.

In the data analysis stage, the training data, for which a training target (e.g. fraud) is provided, can be split into subsets based on one or more categorical variables, called keys. Each subset can contain those data records where the categorical key variables all have the same values, for example, all authorizations with a given country code and particular point-of-sale entry mode, e.g. 840 (USA) AND card-was-swiped, or 124 (Canada) AND card-number-was-keyed. Any mapping from the categorical key values which defines a subset of data can be used.

In some variations, a lightweight regression model can be estimated using just the data subsets/keys. A number of other continuous or binary-valued variables which are known to be predictive can be extracted as well for these records, for example, transaction amount, transaction time, transaction velocity, whether transaction is domestic or foreign, etc. Additional derived variables or transformations of raw data variables may be computed and used as well.

The target in the regression can be the binary fraud tag, conditioned as a function of these other input variables. One example of such a model is a "logistic regression". A logistic regression model provides the logarithm of the odds (e.g. bads to goods; fraud to non fraud, etc,) as a linear function of the other inputs plus a constant offset. The free coefficients in the logistic regression can be estimated using statistical software such as SAS and MATLAB, or by using optimization methods such as iteratively reweighted least-squares and conjugate gradient on the maximum likelihood problem. Methods such as forward, backward, and stepwise selection using Wald statistics can perform automatic variable selection, finding a subset of statistically significant predictor variables, with the deselected variables given a coefficient of zero. The result of this off-line analysis can be a set of coefficients for each key value with sufficient observations. These coefficients can be stored in a table and used for the predictive/scoring model. There can be one coefficient per input to the mini-model, plus a constant term, for each value of the categorical keys. As the split of data by the categorical keys results in significantly smaller subsets of data, complex mini-models should be avoided while ensuring that there is sufficient data in most subsets for good fitting. Simple linear or additive models, with a minimum of free coefficients (as opposed to general nonlinear models like neural networks) can be utilized. In cases where there is not sufficient data or where there is no corresponding key, a default value can be utilized for a particular categorical variable. This default value may, for example, be based on historical transaction data.

During training of the larger overall (global) model, and during scoring, the value of the key for each transaction can be used to extract the set of coefficients. The same inputs to the mini-model used to train the logistic regressions can also be computed, and the logodds of the logistic regression can be recreated using the regression model equation. This logodds, or the probability derived from it, can then be a suitable variable to use for training or scoring in the overall predictive model.

Additionally derived variables computed from the logodds or estimated probability can have useful predictive value in the overall predictive model. Variables from multiple regression models, each keyed on different categorical variables, or the same ones, but with different inputs, can also be used in the overall predictive model.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method comprising:
receiving input data for a predictive model comprising values for categorical variables and one or more of binary variables and continuous variables, the predictive model characterizing a level of risk for a data transaction;
associating one or more of the categorical variables with one of a plurality of keys, each key having corresponding coefficients for at least a subset of the binary variables and the continuous variables, the coefficients being dependent on a value for the key;
generating composite values for composite variables based on values for each of at least a subset of the binary variables and the continuous variables as calculated using the corresponding coefficients for each key; and
initiating scoring of the data transaction by the predictive model using the binary variables, the continuous variables, and the composite variables.

2. A method as in claim 1, wherein the associating and generating utilizes a probability estimation model.

3. A method as in claim 2, wherein the probability estimation model is a linear logistic regression model, the linear logistic regression model providing a logarithm of odds for the data transaction as a linear function of the binary and continuous variables as weighted by the coefficients associated with the keys plus a constant offset.

4. A method as in claim 3, wherein coefficients for binary and continuous variables that have been deemed not to be statistically significant are set to zero.

5. A method as in claim 2, wherein the probability estimation model is a non-linear logistic regression model.

6. A method as in claim 1, wherein at least a subset of the binary variables, the continuous variables, and the composite variables are provided to nodes within the predictive model.

7. A method as in claim 6, wherein the nodes of the predictive model form part of a neural network.

8. A method as in claim 6, wherein the nodes of the predictive model form part of a support vector machine.

9. A method as in claim 1, further comprising associating one or more of the categorical variables with a default value if there is not a corresponding key for such categorical variable.

10. A method as in claim 1, further comprising:
associating one or of the categorical variables with a default value if is determined that the corresponding key does not have sufficient training data.

11. A method as in claim 1, further comprising:
modifying the composite variables value with respect to a default value depending on a quantity of training data for the particular key.

12. A method as in claim 1, wherein the data transaction is a payment card transaction, and the scoring of the data transaction indicates whether the data transaction is likely to be fraudulent.

13. An article comprising a non-transitory machine-readable medium embodying instructions that when performed by one or more machines result in operations comprising:
receiving input data for a predictive model comprising values for categorical variables and one or more of binary variables and continuous variables, the predictive model characterizing a level of risk for a data transaction;
associating one or more of the categorical variables with one of a plurality of keys, each key having corresponding coefficients for at least a subset of the binary variables and the continuous variables, the coefficients being dependent on a value for the key;
generating composite values for composite variables based on values for each of at least a subset of the binary variables and the continuous variables as calculated using the corresponding coefficients for each key; and
initiating scoring of the data transaction by the predictive model using the binary variables, the continuous variables, and the composite variables.

14. An article as in claim 13, wherein the associating and generating utilizes a probability estimation model.

15. An article as in claim 14, wherein the probability estimation model is a linear logistic regression model, the linear logistic regression model providing a logarithm of odds for the data transaction as a linear function of the binary and continuous variables as weighted by the coefficients associated with the keys plus a constant offset.

16. An article as in claim 15, wherein coefficients for binary and continuous variables that have been deemed not to be statistically significant are set to zero.

17. An article as in claim 14, wherein the probability estimation model is a non-linear logistic regression model.

18. An article as in claim 13, wherein at least a subset of the binary variables, the continuous variables, and the composite variables are provided to nodes within the predictive model.

19. An article as in claim 18, wherein the nodes of the predictive model form part of a neural network.

20. An article as in claim 18, wherein the nodes of the predictive model form part of a support vector machine.

21. An article as in claim 13, wherein the machine-readable medium further embodies instructions that when performed by one or more machines result in operations comprising:
associating one or more of the categorical variables with a default value if there is not a corresponding key for such categorical variable.

22. An article as in claim 13, wherein the machine-readable medium further embodies instructions that when performed by one or more machines result in operations comprising:
associating one or more of the categorical variables with a default value if is determined that the corresponding key does not have sufficient training data.

23. An article as in claim 13, wherein the machine-readable medium further embodies instructions that when performed by one or more machines result in operations comprising:
modifying the composite variables with respect to a default value depending on a quantity of training data for the particular key.

24. An article as in claim 13, wherein the data transaction is a payment card transaction, and the scoring of the data transaction indicates whether the data transaction is likely to be fraudulent.

25. A computer-implemented method comprising:
receiving input data for a predictive model comprising values for categorical variables and one or more of binary variables and continuous variables, the predictive model characterizing a level of risk for a data transaction;
associating, for each of at least two cascading sub-models, one or more of the categorical variables with one of a plurality of keys, each key having corresponding coefficients for at least a subset of the binary variables and the continuous variables, the coefficients being dependent on a value for the corresponding key, output for at least one of the cascading sub-models acting as a direct or indirect input to at least one of the other cascading sub-models;
generating composite values for composite variables based on values for each of at least a subset of the binary variables and the continuous variables as calculated using the corresponding coefficients for each key; and
initiating scoring of the data transaction by the predictive model using the binary variables, the continuous variables, and the composite variables determined for each of the at least two cascading sub-models.

* * * * *